United States Patent
Liao et al.

(10) Patent No.: US 12,503,627 B2
(45) Date of Patent: Dec. 23, 2025

(54) POLYOLEFIN BONDING ADHESIVE FILM

(71) Applicant: NAN YA PLASTICS CORPORATION, Taipei (TW)

(72) Inventors: Te-Chao Liao, Taipei (TW); Ching-Yao Yuan, Taipei (TW); Chih-Feng Wang, Taipei (TW); Teng-Ko Ma, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 320 days.

(21) Appl. No.: 18/297,631

(22) Filed: Apr. 9, 2023

(65) Prior Publication Data

US 2024/0191104 A1  Jun. 13, 2024

(30) Foreign Application Priority Data

Dec. 13, 2022 (TW) .................................. 111147680

(51) Int. Cl.
*C09J 7/38* (2018.01)
*B32B 7/12* (2006.01)
(Continued)

(52) U.S. Cl.
CPC ................ *C09J 7/381* (2018.01); *B32B 7/12* (2013.01); *B32B 15/085* (2013.01); *B32B 15/20* (2013.01); *B32B 27/08* (2013.01); *B32B 27/30* (2013.01); *B32B 27/32* (2013.01); *B65D 65/40* (2013.01); *C09J 5/06* (2013.01); *C09J 7/243* (2018.01); *C09J 7/35* (2018.01); *B32B 2250/24* (2013.01);
(Continued)

(58) Field of Classification Search
CPC ..... C09J 7/381; C09J 7/243; C09J 7/35; C09J 151/00; C09J 151/06
See application file for complete search history.

(56) References Cited

U.S. PATENT DOCUMENTS

| | | | |
|---|---|---|---|
| 2012/0074020 A1 | 3/2012 | Kendig et al. | |
| 2013/0209868 A1* | 8/2013 | Suzuta | B32B 27/32 429/176 |

(Continued)

FOREIGN PATENT DOCUMENTS

| | | |
|---|---|---|
| CN | 112789174 A | 5/2021 |
| JP | 6427923 A | 1/1989 |

(Continued)

OTHER PUBLICATIONS

JP 2019-085480 Machine Translation (Year: 2019).*
Astm D1238-13 (Year: 2013).*

*Primary Examiner* — Zachary M Davis
(74) *Attorney, Agent, or Firm* — Li & Cai Intellectual Property Office

(57) ABSTRACT

A polyolefin bonding adhesive film includes a support base layer and a bonding adhesive layer formed on a side surface of the support base layer by co-extrusion. The support base layer is a polypropylene film. The bonding adhesive layer is formed of a first polyolefin copolymer modified by maleic anhydride. The first polyolefin copolymer is formed by copolymerization of at least two kinds of C2 to C4 olefin molecules, a first graft ratio of the maleic anhydride grafted onto the first polyolefin copolymer is between 0.5% and 5%, and a first melt index of the first polyolefin copolymer is between 3 g/10 min and 5 g/10 min.

8 Claims, 2 Drawing Sheets

(51) Int. Cl.
  *B32B 15/085* (2006.01)
  *B32B 15/20* (2006.01)
  *B32B 27/08* (2006.01)
  *B32B 27/30* (2006.01)
  *B32B 27/32* (2006.01)
  *B65D 65/40* (2006.01)
  *C09J 5/06* (2006.01)
  *C09J 7/24* (2018.01)
  *C09J 7/35* (2018.01)

(52) U.S. Cl.
  CPC ....... *B32B 2270/00* (2013.01); *B32B 2307/31* (2013.01); *B32B 2307/7376* (2023.05); *B32B 2307/748* (2013.01); *B32B 2405/00* (2013.01); *B32B 2439/00* (2013.01); *C09J 2301/304* (2020.08); *C09J 2301/414* (2020.08); *C09J 2400/166* (2013.01); *C09J 2423/046* (2013.01); *C09J 2423/10* (2013.01); *C09J 2451/00* (2013.01); *C09J 2451/006* (2013.01); *C09J 2453/006* (2013.01)

(56) References Cited

U.S. PATENT DOCUMENTS

2021/0213715 A1  7/2021  Sugaya et al.
2022/0416334 A1  12/2022  Fujimoto et al.

FOREIGN PATENT DOCUMENTS

| JP | H5-293159 A | 11/1993 |
| JP | 9164639 A | 6/1997 |
| JP | 200288328 A | 3/2002 |
| JP | 2004182304 A | 7/2004 |
| JP | 2016-3265 A | 1/2016 |
| JP | 2017509723 A | 4/2017 |
| JP | 2019-85480 A | 6/2019 |
| JP | 2019085480 A * | 6/2019 |
| JP | 202049896 A | 4/2020 |
| JP | 2021523956 A | 9/2021 |
| JP | 2022122641 A | 8/2022 |
| TW | 202128920 A | 8/2021 |
| WO | 2012-050182 A1 | 4/2012 |
| WO | WO2015092184 A1 | 6/2015 |
| WO | WO2019183871 A1 | 10/2019 |

* cited by examiner

POLYOLEFIN BONDING ADHESIVE FILM

CROSS-REFERENCE TO RELATED PATENT APPLICATION

This application claims the benefit of priority to Taiwan Patent Application No. 111147680, filed on Dec. 13, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a bonding adhesive film, and more particularly to a polyolefin bonding adhesive film.

BACKGROUND OF THE DISCLOSURE

As shown in FIG. 5, a conventional aluminum-plastic film packaging material usually adopts a dry composite lamination film composed of a polyolefin film PL and an aluminum foil AF. The polyolefin film PL and the aluminum foil AF are bonded together by a glue layer GL (e.g., a polyester or polyurethane glue). However, during a lamination process, the conventional aluminum-plastic film packaging material is prone to volatilization of volatile organic solvents (VOCs). In addition, a bonding strength between the polyolefin film PL and the aluminum foil AF declines after the conventional aluminum-plastic film packaging material is exposed to a high temperature and a high humidity for an extended period of time, thereby resulting in an insufficient bonding strength.

SUMMARY OF THE DISCLOSURE

In response to the above-referenced technical inadequacies, the present disclosure provides a polyolefin bonding adhesive film.

In one aspect, the present disclosure provides a polyolefin bonding adhesive film that includes a support base layer and a bonding adhesive layer. The support base layer is a polypropylene film. The bonding adhesive layer is formed on a side surface of the support base layer by co-extrusion. The bonding adhesive layer is formed of a first polyolefin copolymer modified by maleic anhydride. The first polyolefin copolymer is formed by copolymerization of at least two kinds of C2 to C4 olefin molecules, a first graft ratio of the maleic anhydride grafted onto the first polyolefin copolymer is between 0.5% and 5%, and a first melt index of the first polyolefin copolymer is between 3 g/10 min and 5 g/10 min.

In certain embodiments, in the bonding adhesive layer, the first melt index of the first polyolefin copolymer is between 3 g/10 min and 4 g/10 min.

In certain embodiments, the support base layer is a cast polypropylene film, and a material composition of the support base layer includes: a propylene block polymer, a vinyl elastomer, and a second polyolefin copolymer.

In certain embodiments, in the support base layer, the propylene block polymer includes blocks composed of ethylene propylene elastic rubber, and a weight percentage of the ethylene propylene elastic rubber in the propylene block polymer is at least 18%. The vinyl elastomer is an ethylene-butylene elastomer, and a weight percentage of ethylene in the vinyl elastomer is at least 30%.

In certain embodiments, in the support base layer, the second polyolefin copolymer is modified by maleic anhydride, the second polyolefin copolymer is formed by copolymerization of at least two kinds of C2 to C4 olefin molecules, a second graft ratio of the maleic anhydride grafted onto the second polyolefin copolymer is between 0.5% and 5%, and a second melt index of the second polyolefin copolymer is between 3 g/10 min and 5 g/10 min.

In certain embodiments, in the support base layer, based on a total weight of the support base layer being 100 wt %, a content of the propylene block polymer is between 50 wt % and 90 wt %, a content of the vinyl elastomer is between 5 wt % and 30 wt %, and a content of the second polyolefin copolymer modified by the maleic anhydride is between 5 wt % and 20 wt %.

In certain embodiments, the polyolefin bonding adhesive film further includes a heat sealing film layer that is formed on another side surface of the support base layer by co-extrusion.

In certain embodiments, a material composition of the heat sealing film layer is a propylene polymer, and the propylene polymer is at least one of a propylene copolymer (co-PP) and a propylene homopolymer (homo-PP).

In certain embodiments, a heat sealing strength of the heat sealing film layer of the polyolefin bonding adhesive film measured according to QB/T2358-1998 is not less than 80 N/15 mm.

In certain embodiments, a first thickness of the bonding adhesive layer is between 4 μm (micrometers) and 12 μm, a second thickness of the support base layer is between 15 μm and 35 μm, and a third thickness of the heat sealing film layer is between 4 μm and 12 μm.

In certain embodiments, the polyolefin bonding adhesive film is able to be bonded to a metal aluminum foil through the bonding adhesive layer, and a peeling strength between the polyolefin bonding adhesive film and the metal aluminum foil is not less than 10 N/15 mm.

In certain embodiments, another peeling strength obtained by testing an aluminum-plastic film formed of the polyolefin bonding adhesive film and the metal aluminum foil after being placed in an electrolyte environment at 85° C. and soaked for 168 hours, is greater than 8.5 N/15 mm.

Therefore, in the polyolefin bonding adhesive film provided by the present disclosure, by virtue of "a support base layer being a polypropylene film," and "a bonding adhesive layer being formed on a side surface of the support base layer by co-extrusion; in which the bonding adhesive layer is formed of a first polyolefin copolymer modified by maleic anhydride, the first polyolefin copolymer is formed by copolymerization of at least two kinds of C2 to C4 olefin molecules, a first graft ratio of the maleic anhydride grafted onto the first polyolefin copolymer is between 0.5% and 5%, and a first melt index of the first polyolefin copolymer is between 3 g/10 min and 5 g/10 min," the polyolefin bonding adhesive film can be directly and thermally bonded to a metal aluminum foil through the bonding adhesive layer that is formed on the support base layer by co-extrusion, and a polyester or polyurethane glue is not required for bonding.

The polyolefin bonding adhesive film of the present disclosure not only has self-bonding properties, but also solves the problem of volatilization of volatile organic solvents (VOCs) that exists in the bonding process of the related art. In addition, the polyolefin bonding adhesive film of the present disclosure also solves the problem of insufficient bonding strength caused by the deterioration of bonding strength of dry composite polyolefin film/aluminum foil packaging materials of the related art exposed under a high-temperature and high-humidity environment for an extended period of time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
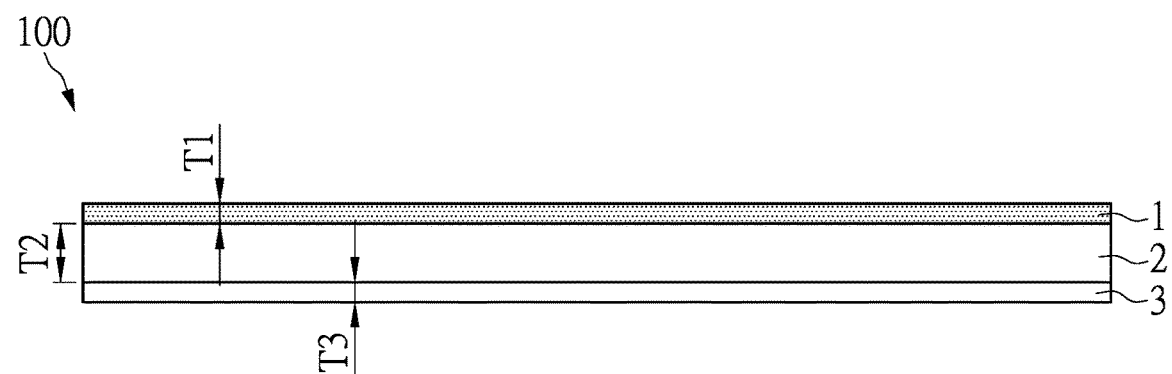
FIG. 1 is a schematic view showing a polyolefin bonding adhesive film according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
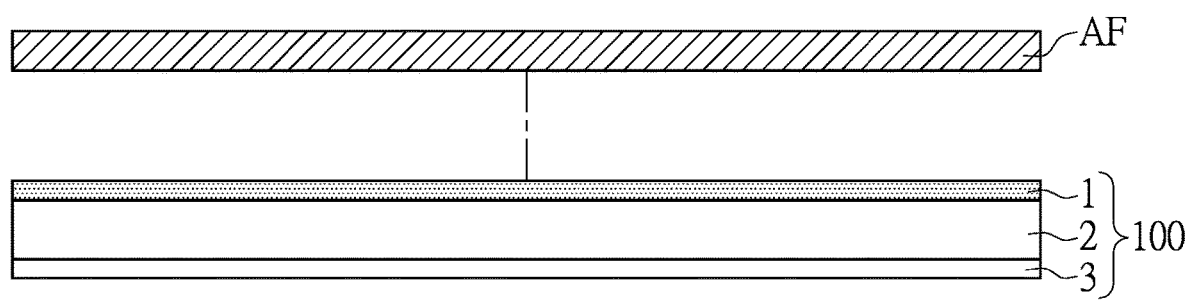
FIG. 2 is a schematic view showing the polyolefin bonding adhesive film as shown in FIG. 1 being bonded to an aluminum foil.
Figure 3:
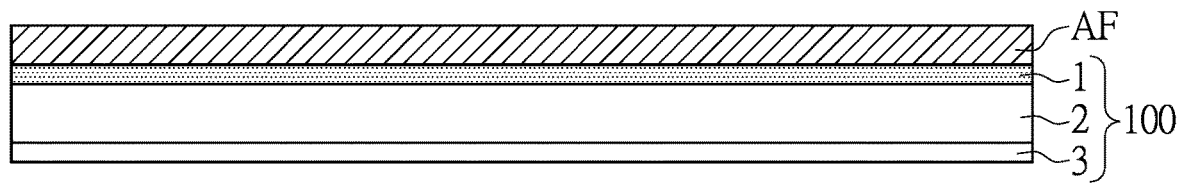
FIG. 3 is another schematic view showing the polyolefin bonding adhesive film as shown in FIG. 1 being bonded to the aluminum foil.

Referring to FIG. 1 to FIG. 3, a first embodiment of the present disclosure provides a polyolefin bonding adhesive film 100 that includes a bonding adhesive layer 1, a support base layer 2, and a heat sealing film layer 3. The bonding adhesive layer 1 is formed on a side surface of the support base layer 2 (i.e., an upper surface of the support base layer 2 as shown in FIG. 1). The heat sealing film layer 3 is formed on another side surface of the support base layer 2 (i.e., a lower surface of the support base layer 2 as shown in FIG. 1). That is, the support base layer 2 is located between the bonding adhesive layer 1 and the heat sealing film layer 3.

In the present embodiment, the bonding adhesive layer 1, the support base layer 2, and the heat sealing film layer 3 of the polyolefin bonding adhesive film 100 are formed into a laminated film layer structure by co-extrusion. That is, the bonding adhesive layer 1 is formed on the support base layer 2 by co-extrusion.

The polyolefin bonding adhesive film 100 is able to be bonded to a metal aluminum foil AF through the bonding adhesive layer 1 as shown in FIG. 2 and FIG. 3. The support base layer 2 enables the polyolefin bonding adhesive film 100 to have impact resistance and supporting characteristics. Furthermore, the heat sealing film layer 3 enables the polyolefin bonding adhesive film 100 to be heat-sealable. Accordingly, the polyolefin bonding adhesive film 100 is suitable for use in packaging materials, especially packaging materials for lithium batteries or packaging materials for electronic products, but the present disclosure is not limited thereto.

In terms of thickness, a first thickness T1 of the bonding adhesive layer 1 is between 4 μm and 12 μm, and preferably between 6 μm and 10 μm. A second thickness T2 of the support base layer 2 is between 15 μm and 35 μm, and preferably between 20 μm and 28 μm. In addition, a third thickness T3 of the heat sealing film layer 3 is between 4 μm and 12 μm, and preferably between 6 μm and 10 μm.

Furthermore, the bonding adhesive layer 1 is formed of a first polyolefin copolymer that is modified by maleic anhydride (MAH).

The first polyolefin copolymer can, for example, be formed by copolymerization of at least two kinds of C2 to C4 olefin molecules. It should be known by those skilled in the art that the C2 olefin molecule is ethylene (PE), the C3 olefin molecule is propylene (PP), and the C4 olefin molecule is butylene, such as 1-butylene.

For example, the raw materials for forming the first polyolefin copolymer can be, for example, C2 olefin molecules and C3 olefin molecules, C2 olefin molecules and C4 olefin molecules, C3 olefin molecules and C4 olefin molecules, or C2 to C4 olefin molecules. Preferably, the raw materials for forming the polyolefin copolymer can be, but not limited to, C3 olefin molecules and C4 olefin molecules. In addition, a weight ratio between the two kinds of olefin molecules (i.e., C3 olefin molecules and C4 olefin molecules, or C2 olefin molecules and C4 olefin molecules) can, for example, be from 30:70 to 70:30, and preferably from 40:60 to 60:40, but is not limited thereto.

It is worth mentioning that the first polyolefin copolymer of the present embodiment is formed by the copolymerization reaction of at least two kinds of C2 to C4 olefin molecules, such that the bonding adhesive layer 1 can have high transparency and bonding ability.

Further, in the present embodiment, the first polyolefin copolymer is modified by the maleic anhydride (MAH). The first polyolefin copolymer modified by the maleic anhydride can have carboxyl groups (—COOH), so that the polarity of the first polyolefin copolymer can be greatly improved. The first polyolefin copolymer modified by the maleic anhydride can have better water solubility and bonding ability compared to an unmodified polyolefin copolymer, so that the first polyolefin copolymer is more suitable for forming an adhesive layer.

The maleic anhydride can be, for example, grafted onto the first polyolefin copolymer. More specifically, the maleic anhydride can be, for example, melt-grafted onto the first polyolefin copolymer. The melt grafting modification can be performed in a single-screw extruder, a twin-screw extruder, or a rheometer, and is preferably performed in a twin-screw extruder.

In the bonding adhesive layer 1, a content of the first polyolefin copolymer is not less than 90 wt %, and preferably not less than 95 wt %. In addition, a first graft ratio of the maleic anhydride grafted onto the first polyolefin copolymer is preferably between 0.5% and 5%.

It is worth mentioning that, in the present embodiment, the first graft ratio of the maleic anhydride needs to be controlled between 0.5% and 5% in order to provide better bonding ability. If the first graft ratio of the maleic anhydride is lower than 0.5%, the bonding ability of the bonding adhesive layer 1 will be deteriorated. Conversely, if the first graft ratio of the maleic anhydride is higher than 5%, the bonding adhesive layer 1 will be too rigid after being bonded to an aluminum foil, thereby affecting the bending resistance of a packaging material.

It should be noted that the "graft ratio" of the maleic anhydride referred to herein can be analyzed by Fourier-transform infrared spectroscopy (FTIR). Fourier-transform infrared spectroscopy can not only qualitatively analyze whether or not the maleic anhydride is grafted onto the molecular chain of the polyolefin copolymer, but also quantify the graft ratio of the maleic anhydride. It can be seen from an infrared spectrum that a maleic anhydride grafted substance has obvious absorption peaks at 1725 cm$^{-1}$ and 1790 cm$^{-1}$, and the absorption peaks are characteristic peaks of carboxyl groups in the maleic anhydride. In addition, a quantitative analysis of the graft ratio of the maleic anhydride can be performed, for example, according to the Lambert-Beer law.

Further, in the present embodiment, a first melt index (MI) of the first polyolefin copolymer modified by the maleic anhydride is controlled between 3 g/10 min and 5 g/10 min, and preferably between 3 g/10 min and 4 g/10 min.

It is worth mentioning that, in the present embodiment, the first melt index of the first polyolefin copolymer needs to be controlled between 3 g/10 min and 5 g/10 min to enable the bonding adhesive layer 1 to have better bonding ability, transparency, and appearance (i.e., no obvious streaks are observed on a flat surface of a packaging material). If the first melt index of the first polyolefin copolymer exceeds the above-mentioned range, the bonding adhesive layer 1 may have poor adhesion or streaks may be observed on the surface of the packaging material.

It should be noted that the "melt index (MI)" referred to herein refers to a weight of the polyolefin copolymer passing through a standard die every 10 minutes on a melt flow velocimeter, and the unit of the melt index is g/10 min. The melt index represents the fluidity of a resin material in a molten state. The larger the melt index is, the smaller the molecular weight of the resin material is, and the better the fluidity of the resin material is. Conversely, the larger the molecular weight of the resin material is, the more difficult it is for the molecular chain to move; further, the smaller the melt index is, the worse the fluidity of the resin material is. In the present embodiment, the melt index is measured according to ASTM D1238 under the conditions of 190° C. and a load of 2.16 kg.

It is worth mentioning that the preparation of the first polyolefin copolymer can be carried out in the presence of a peroxidant (a content of the peroxidant is from 0.3% to 0.6%). The first polyolefin copolymer is pelletized by a twin-screw extruder and melt-grafted by the maleic anhydride. In addition, the melt index of the first polyolefin copolymer can also be controlled during the extruding process.

Further, the first polyolefin copolymer that is pelletized can be, for example, formed as the bonding adhesive layer 1 on the side surface of the support base layer 2 by co-extrusion.

According to the above-mentioned technical solution, the polyolefin bonding adhesive film 100 of the embodiment of the present disclosure can be directly and thermally bonded to the metal aluminum foil AF through the bonding adhesive layer 1 thereof as shown in FIG. 2 and FIG. 3, so that no additional polyester glue or polyurethane glue is required for bonding.

The polyolefin bonding adhesive film 100 of the embodiment of the present disclosure not only has self-bonding properties, but also can solve the problem of volatilization of volatile organic solvents (VOC) that exists in the bonding process of the related art. In addition, the polyolefin bonding adhesive film 100 of the embodiment of the present disclosure can also solve the problem of insufficient bonding strength caused by the deterioration of bonding strength of dry composite polyolefin film/aluminum foil packaging materials of the related art under a high-temperature and high-humidity environment for an extended period of time.

Further referring to FIG. 1, the support base layer 2 can be a cast polypropylene film (CPP film, also known as an un-stretched polypropylene film), which enables the polyolefin bonding adhesive film 100 to have impact resistance and supporting properties required in packaging materials.

More specifically, a material composition of the support base layer 2 includes: a propylene block polymer, a vinyl elastomer, a second polyolefin copolymer modified by maleic anhydride (MAH), and a slip agent.

Based on a total weight of the support base layer 2 being 100 wt %, a content of the propylene block polymer is between 50 wt % and 90 wt %, and preferably between 60 wt % and 80 wt %. In addition, a content of the vinyl elastomer is between 5 wt % and 30 wt %, and preferably between 15 wt % and 25 wt %. A content of the second polyolefin copolymer modified by the maleic anhydride is between 5 wt % and 20 wt %, and preferably between 5 wt % and 15 wt %. A content of the slip agent is between 100 ppm and 5,000 ppm, and preferably between 1,000 ppm and 4,000 ppm.

Further, the propylene block polymer includes blocks composed of ethylene propylene elastic rubber (EPR), and a weight percentage of the ethylene propylene elastic rubber in the propylene block polymer is at least 18%, and preferably between 18% and 30%, but the present disclosure is not limited thereto.

It is worth mentioning that a content of the ethylene propylene elastic rubber in the propylene block polymer needs to be within the above weight percentage of between 18% and 30%, so that the support base layer 2 can have good moldability.

Furthermore, the vinyl elastomer can be, for example, an ethylene-butylene elastomer, which is a copolymer formed of ethylene, butane, and a small amount of bridging terminal monomers having carboxylic acid groups. A weight percentage of the ethylene in the vinyl elastomer is at least 30%, and preferably between 30% and 60%. Accordingly, the vinyl elastomer enables the support base layer 2 to have better moldability, and can prevent the support base layer 2 from impact whitening.

In the support base layer 2, the second polyolefin copolymer modified by the maleic anhydride can be similar in material characteristics to the bonding adhesive layer 1. The second polyolefin copolymer is formed by copolymerization of at least two kinds of C2 to C4 olefin molecules. Furthermore, a second graft ratio of the maleic anhydride grafted onto the second polyolefin copolymer is between 0.5% and 5%, and a second melt index of the second polyolefin copolymer modified by the maleic anhydride is between 3 g/10 min and 5 g/10 min.

In the present embodiment, since the support base layer 2 includes a small amount of the second polyolefin copolymer modified by the maleic anhydride (e.g., between 5 wt % and 20 wt %), the support base layer 2 can have a higher affinity to the bonding adhesive layer 1, so that the support base layer 2 and the bonding adhesive layer 1 can have a good interlayer bonding strength therebetween.

If the content of the second polyolefin copolymer modified by the maleic anhydride in the support base layer 2 is lower than the above-mentioned content range, the interlayer bonding strength will become poor. On the contrary, if the content of the second polyolefin copolymer modified by the maleic anhydride in the support base layer 2 is higher than the above-mentioned content range, the moldability of the packaging material will be deteriorated.

Furthermore, the slip agent can be, for example but not limited to, silicon dioxide ($SiO_2$) or talc, which can improve the moldability and processability of the support base layer 2.

Furthermore, the support base layer 2 has a visible light transmittance of between 80% and 99% and a haze value of between 5% and 30%, but the present disclosure is not limited thereto. It should be noted that the visible light transmittance and the haze value are tested according to ASTM D1003.

Further referring to FIG. 1, the material composition of the heat sealing film layer 3 is a propylene polymer.

For example, the propylene polymer can be at least one of a propylene co-polymer (co-PP) and a propylene homo-polymer (homo-PP). The propylene copolymer can, for example, be formed by copolymerization of propylene and ethylene. In the present embodiment, a weight percentage of the ethylene in the propylene copolymer is preferably not greater than 2%. Accordingly, the heat sealing film layer 3 improves the heat-sealing strength of the polyolefin bonding adhesive film 100.

According to the above-mentioned technical solution, the polyolefin bonding adhesive film 100 of the embodiment of the present disclosure can be directly and thermally bonded to a metal aluminum foil AF through the bonding adhesive layer 1 that is formed on the support base layer 2 by co-extrusion as shown in FIG. 2 and FIG. 3, and does not require any additional polyester or polyurethane glue for bonding. The polyolefin bonding adhesive film 100 of the embodiment of the present disclosure not only has self-bonding properties, but also solves the problem of volatilization of volatile organic solvents (VOCs) during the bonding process in the related art. In addition, the polyolefin bonding adhesive film 100 of the embodiment of the present disclosure also solves the problem of insufficient bonding strength caused by the deterioration of bonding strength of dry composite polyolefin film/aluminum foil packaging materials in the related art exposed under a high temperature and high humidity environment for an extended period of time. Furthermore, the heat sealing film layer 3 of the polyolefin bonding adhesive film 100 of the embodiment of the present disclosure has an excellent heat sealing strength. A heat sealing strength of the polyolefin bonding adhesive film 100 of the embodiment of the present disclosure measured according to QB/T2358-1998 can reach 80 N/15 mm. The test conditions can be, for example, cutting a sample into a size of 15 mm*15 mm and conducting a measurement at a temperature of 180° C. and a pressure of 1 $kgf/cm^2$ after a heat sealing time of 3 seconds. The polyolefin bonding adhesive film 100 still has an interlayer bonding strength of greater than 8.5 N/15 mm after being soaked in an electrolyte environment at 85° C. for 168 hours. The polyolefin bonding adhesive film 100 of the embodiment of the present disclosure is suitable for use in packaging materials, especially packaging materials for lithium batteries or packaging materials for electronic products.

To prove the above-mentioned technical effects of the polyolefin bonding adhesive film of the present disclosure, Exemplary Examples 1 to 4 and Comparative Examples 1 to 3 will be described below. Among them, Exemplary Examples 1 to 4 are the groups that can prove the technical effects of the present disclosure, and Comparative Examples 1 to 3 are groups with poor experimental effects. However, the following Exemplary Examples are only intended to aid in the understanding of the present disclosure, and the scope of the present disclosure is not limited to the contents of these Exemplary Examples.

Exemplary Example 1: Exemplary Example 1 provides a three-layer laminated polyolefin bonding adhesive film formed by co-extrusion, which includes a bonding adhesive layer, a support base layer, and a heat sealing film layer that are stacked in sequence. The bonding adhesive layer is formed by a first polyolefin copolymer modified by maleic anhydride. The first polyolefin copolymer is formed by copolymerization of propylene (C3) and butylene (C4). A content of the first polyolefin copolymer in the bonding adhesive layer is 99.5 wt %. A graft ratio of the maleic anhydride (MA) grafted onto the first polyolefin copolymer is 0.5%, and a melt index (MI) of the first polyolefin copolymer is 3.2 g/10 min. Based on a total weight of the support base layer being 100 wt %, a material composition of the support base layer includes 70 wt % of a propylene block polymer, 20 wt % of a vinyl elastomer (i.e., an ethylene-butylene elastomer), 10 wt % of a second polyolefin copolymer modified by maleic anhydride, and a small amount of $SiO_2$. The heat sealing film layer is composed of a propylene copolymer (co-PP), which is formed by the copolymerization of propylene and ethylene, and a weight percentage of the ethylene in the heat sealing film layer is not greater than 2%. In addition, a thickness of the bonding adhesive layer is 8 μm, a thickness of the support base layer is 24 μm, and a thickness of the heat sealing film layer is 8 μm. The polyolefin bonding adhesive film of Exemplary Example 1 has a haze value of 6%, and an appearance of the adhesive film has no obvious streaks. A heat sealing strength of the polyolefin bonding adhesive film measured according to QB/T2358-1998 is 81 N/15 mm. The polyolefin bonding adhesive film is further bonded to an aluminum foil through the bonding adhesive layer, and a peeling strength that is measured between the polyolefin bonding adhesive film and the aluminum foil is 10.2 N/15 mm. Furthermore, after immersing an aluminum-plastic film formed by the polyolefin bonding adhesive film bonded to the aluminum foil in an electrolyte environment at 85° C. for 168 hours, the aluminum-plastic film still has a peeling strength (i.e., an interlayer bonding strength) of 8.5 N/15 mm. The polyolefin bonding adhesive film is quite resistant to high temperature and high humidity environments. In addition, the aluminum-plastic film has a bending resistance of 12 times and a molding height of 6 mm, so that the aluminum-plastic film is suitable for lithium battery packaging materials.

Exemplary Example 2: The preparation conditions of Exemplary Example 2 are substantially the same as those of Exemplary Example 1. The difference is that in the bonding adhesive layer of Exemplary Example 2, the first polyolefin copolymer is formed by copolymerization of propylene (C3) and butylene (C4), and a content of the first polyolefin copolymer is 97 wt %. A graft ratio of the maleic anhydride (MA) grafted onto the first polyolefin copolymer is 3%, and a melt index (MI) of the first polyolefin copolymer is 3.1 g/10 min. The polyolefin bonding adhesive film of Exemplary Example 2 has a haze value of 7%, and the appearance of the adhesive film has no obvious streaks. A heat sealing strength of the polyolefin bonding adhesive film measured according to QB/T2358-1998 is 82 N/15 mm. A peeling strength between the polyolefin bonding adhesive film and the aluminum foil is 14.2 N/15 mm. After immersing an aluminum-plastic film formed by the polyolefin bonding adhesive film bonded to the aluminum foil in an electrolyte environment at 85° C. for 168 hours, the aluminum-plastic film still has a peeling strength of 13.2 N/15 mm. In addition, the aluminum-plastic film has a bending resistance of 13 times and a molding height of 6.5 mm, so that the aluminum-plastic film is suitable for lithium battery packaging materials.

Exemplary Example 3: The preparation conditions of Exemplary Example 3 are substantially the same as those of Exemplary Example 1. The difference is that in the bonding adhesive layer of Exemplary Example 3, the first polyolefin copolymer is formed by copolymerization of propylene (C3) and butylene (C4), and a content of the first polyolefin copolymer is 95 wt %. A graft ratio of the maleic anhydride (MA) grafted onto the first polyolefin copolymer is 5%, and a melt index (MI) of the first polyolefin copolymer is 3.4 g/10 min. The polyolefin bonding adhesive film of Exemplary Example 3 has a haze value of 6.5%, and the appearance of the adhesive film has no obvious streaks. A heat sealing strength of the polyolefin bonding adhesive film measured according to QB/T2358-1998 is 81 N/15 mm. A peeling strength between the polyolefin bonding adhesive film and the aluminum foil is 13.2 N/15 mm. After immersing an aluminum-plastic film formed by the polyolefin bonding adhesive film bonded to the aluminum foil in an electrolyte environment at 85° C. for 168 hours, the aluminum-plastic film still has a peeling strength of 12.0 N/15 mm. In addition, the aluminum-plastic film has a bending resistance of 11 times and a molding height of 5 mm, so that the aluminum-plastic film is suitable for lithium battery packaging materials.

Exemplary Example 4: The preparation conditions of Exemplary Example 4 are substantially the same as those of Exemplary Example 1. The difference is that in the bonding adhesive layer of Exemplary Example 4, the first polyolefin copolymer is formed by copolymerization of ethylene (C2) and butylene (C4), and a content of the first polyolefin copolymer is 97 wt %. A graft ratio of the maleic anhydride (MA) grafted onto the first polyolefin copolymer is 3%, and a melt index (MI) of the first polyolefin copolymer is 3.2 g/10 min. The polyolefin bonding adhesive film of Exemplary Example 4 has a haze value of 15%, and whether or not the appearance of the adhesive film has streaks is unable to be observed. A heat sealing strength of the polyolefin bonding adhesive film measured according to QB/T2358-1998 is 83 N/15 mm. A peeling strength between the polyolefin bonding adhesive film and the aluminum foil is 12.8 N/15 mm. After immersing an aluminum-plastic film formed by the polyolefin bonding adhesive film bonded to the aluminum foil in an electrolyte environment at 85° C. for 168 hours, the aluminum-plastic film still has a peeling strength of 11.2 N/15 mm. In addition, the aluminum-plastic film has a bending resistance of 12 times and a molding height of 6 mm. Although the haze value of the polyolefin bonding adhesive film is relatively high, the polyolefin bonding adhesive film is still suitable for lithium battery packaging materials.

Comparative Example 1: The preparation conditions of Comparative Example 1 are substantially the same as those of Exemplary Example 1. The difference is that in the bonding adhesive layer of Comparative Example 1, the first polyolefin copolymer is formed by copolymerization of propylene (C3) and butylene (C4), and a content of the first polyolefin copolymer is 94 wt %. A graft ratio of the maleic anhydride (MA) grafted onto the first polyolefin copolymer is 6%, and a melt index (MI) of the first polyolefin copolymer is 3.5 g/10 min. The polyolefin bonding adhesive film of Comparative Example 1 has a haze value of 7.5%, and the appearance of the adhesive film has no obvious streaks. A heat sealing strength of the polyolefin bonding adhesive film measured according to QB/T2358-1998 is 80.5 N/15 mm. A peeling strength between the polyolefin bonding adhesive film and the aluminum foil is 13.5 N/15 mm. After immersing an aluminum-plastic film formed by the polyolefin bonding adhesive film bonded to the aluminum foil in an electrolyte environment at 85° C. for 168 hours, the aluminum-plastic film still has a peeling strength of 13 N/15 mm. In addition, the aluminum-plastic film has a bending resistance of merely 7 times and a molding height of merely 4.5 mm. From the aforementioned experimental results, it can be seen that the number of times of bending resistance and the molding height of the polyolefin bonding adhesive film of Comparative Example 1 are lower than those of Exemplary Examples 1 to 4, so that the polyolefin bonding adhesive film of Comparative Example 1 is not suitable for lithium battery packaging materials. The reason for the poor physical properties may be that the graft ratio of the maleic anhydride (MA) grafted onto the first polyolefin copolymer in Comparative Example 1 is too high (6%), which is greater than the ideal value of 5%, so that the hardness of the polyolefin bonding adhesive film and the aluminum foil that are bonded becomes too high, and the aluminum-plastic film is not resistant to bending and impact.

Comparative Example 2: The preparation conditions of Comparative Example 2 are substantially the same as those of Exemplary Example 1. The difference is that in the bonding adhesive layer of Comparative Example 2, the first polyolefin copolymer is completely composed of propylene (C3) and butylene (C4), the first polyolefin copolymer has no maleic anhydride grafted thereon, and the first polyolefin copolymer has a melt index (MI) of 5 g/10 min. The polyolefin bonding adhesive film of Comparative Example 2 has a haze value of 6.2%, and the appearance of the adhesive film has no obvious streaks. A heat sealing strength of the polyolefin bonding adhesive film measured according to QB/T2358-1998 is 82 N/15 mm. A peeling strength between the polyolefin bonding adhesive film and the aluminum foil is merely 5.2 N/15 mm. After immersing an aluminum-plastic film formed by the polyolefin bonding adhesive film bonded to the aluminum foil in an electrolyte environment at 85° C. for 168 hours, the aluminum-plastic film has a peeling strength of merely 3.2 N/15 mm. In addition, the aluminum-plastic film has a bending resistance of 10 times and a molding height of 6 mm. The polyolefin bonding adhesive film of Comparative Example 2 may have a poor interlayer peeling strength due to no modification of maleic anhydride.

Comparative Example 3: The preparation conditions of Comparative Example 3 are substantially the same as those of Exemplary Example 1. The difference is that in the bonding adhesive layer of Comparative Example 3, the first polyolefin copolymer is formed by copolymerization of propylene (C3) and butylene (C4), and a content of the first polyolefin copolymer is 97 wt %. A graft ratio of the maleic anhydride (MA) grafted onto the first polyolefin copolymer is 3%, and a melt index (MI) of the first polyolefin copolymer is 7 g/10 min. The polyolefin bonding adhesive film of Comparative Example 3 has a haze value of 6.1%, and the appearance of the adhesive film has severe streaks. A heat sealing strength of the polyolefin bonding adhesive film measured according to QB/T2358-1998 is 83 N/15 mm. A peeling strength between the polyolefin bonding adhesive film and the aluminum foil is 11.2 N/15 mm. After immersing an aluminum-plastic film formed by the polyolefin bonding adhesive film bonded to the aluminum foil in an electrolyte environment at 85° C. for 168 hours, the aluminum-plastic film has a peeling strength of 9.5 N/15 mm. In addition, the aluminum-plastic film has a bending resistance of 11 times and a molding height of 6 mm. The polyolefin bonding adhesive film of Comparative Example 3 has severe streaks in appearance due to having the high melt index (i.e., MI being greater than 5 g/10 min). Therefore, the polyolefin bonding adhesive film is not suitable for lithium battery packaging materials.

It should be noted that testing methods for the above-mentioned "haze value" and "heat sealing strength" have been described in the above-mentioned embodiments of the present disclosure, and will not be reiterated herein.

Furthermore, the "peeling strength" mentioned in the present disclosure refers to a maximum force required per unit width when bonded materials are peeled apart from a contact surface of the bonded materials (i.e., a contact surface between the polyolefin bonding adhesive film and the aluminum foil). The testing instrument used to measure the peeling strength is a universal testing machine. An indication error of the instrument is within plus or minus 1% of an actual value. The test conditions include an ambient temperature of 23° C. plus or minus 2° C., a relative humidity of 50% plus or minus 5%, and a storage time that is greater than 4 hours. The sample preparation includes taking an appropriate amount of a sample; and respectively removing 50 mm from both ends of the sample in a widthwise direction of the sample. Five samples are cut evenly, and each of the samples has a transverse width of 15.0 mm plus or minus 0.1 mm and a length of 200 mm. The testing process is to clamp both ends of a peeled part of the sample in the upper and lower clamps of the testing instrument, so that a longitudinal axis of the peeled part of the sample coincides with a center connecting line of the upper and lower clamps, and the tightness of the clamps is adjusted to be suitable for testing. The test speed is 300 mm/min plus or minus 30 mm/min, and a peeling force curve during a peeling process of the sample is recorded. The arithmetic mean values of the longitudinal and transverse peeling strengths of each group of the samples are respectively calculated to obtain the test results, and two significant figures are taken. The unit of the peeling strength is expressed in N/15 mm.

Furthermore, the "times of bending resistance" mentioned in the present disclosure refers to the number of times that the aluminum-plastic film formed by the polyolefin bonding adhesive film being bonded to the aluminum foil can withstand a test of four-legged folding (i.e., the number of times that cracks do not occur). In addition, the "molding height" mentioned in the present disclosure refers to the height recorded by filling the aluminum-plastic film into a 5 cm*6 cm mold of a lithium battery by cold pressing, and the unit is expressed in mm.

The evaluation process for the appearance of the packaging material is to observe the surface of the bonding adhesive layer of the packaging material with the naked eye (at a distance of about 30 cm) of a tester. If no obvious streaks can be observed, the evaluation result is recorded as having no obvious streaks. If obvious streaks can be observed, the evaluation result is recorded as having severe streaks. If the streaks cannot be observed since the haze value of the packaging material is too high, the evaluation result is recorded as unobservable.

Second Embodiment

Figure 4:
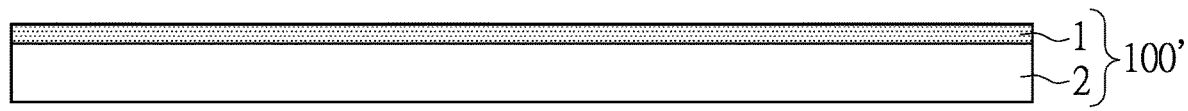
FIG. 4 is a schematic view showing a polyolefin bonding adhesive film according to a second embodiment of the present disclosure.
Figure 5:
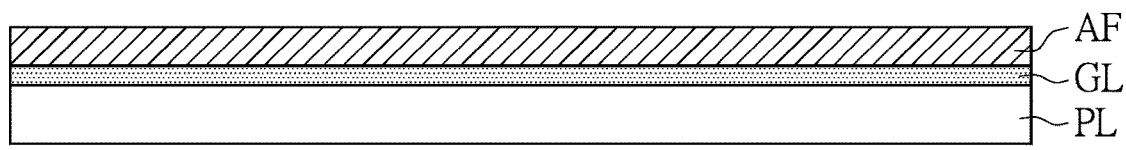
FIG. 5 is a schematic view showing a conventional aluminum-plastic film packaging material.

Referring to FIG. 4, a second embodiment of the present disclosure further provides a polyolefin bonding adhesive film 100' that includes a bonding adhesive layer 1 and a support base layer 2. The bonding adhesive layer 1 is formed on the support base layer 2 by co-extrusion. Different from the above-mentioned first embodiment, the polyolefin bonding adhesive film 100' of the second embodiment of the present disclosure may, for example, not include the heat sealing film layer 3.

In the second embodiment, the material characteristics of the bonding adhesive layer 1 and the support base layer 2 are similar to those of the first embodiment, and will not be reiterated herein.

According to the above configuration, the polyolefin bonding adhesive film 100' of the second embodiment of the present disclosure can be directly and thermally bonded to a metal aluminum foil AF through the bonding adhesive layer 1 that is formed on the support base layer 2 by co-extrusion, so that no additional polyester glue or polyurethane glue is required for bonding.

Beneficial Effects of the Embodiments

Therefore, in the polyolefin bonding adhesive film provided by the present disclosure, by virtue of "a support base layer being a polypropylene film," and "a bonding adhesive layer being formed on a side surface of the support base layer by co-extrusion; in which the bonding adhesive layer is formed of a first polyolefin copolymer modified by maleic anhydride, the first polyolefin copolymer is formed by copolymerization of at least two kinds of C2 to C4 olefin molecules, a first graft ratio of the maleic anhydride grafted onto the first polyolefin copolymer is between 0.5% and 5%, and a first melt index of the first polyolefin copolymer is between 3 g/10 min and 5 g/10 min," the polyolefin bonding adhesive film can be directly and thermally bonded to a metal aluminum foil through the bonding adhesive layer that is formed on the support base layer by co-extrusion, so that no additional polyester glue or polyurethane glue is required for bonding.

The polyolefin bonding adhesive film of the present disclosure not only has self-bonding properties, but also solves the problem of volatilization of volatile organic solvents (VOCs) existing in the bonding process of the related art. In addition, the polyolefin bonding adhesive film of the present disclosure also solves the problem of insufficient bonding strength caused by the deterioration of bonding strength of dry composite polyolefin film/aluminum foil packaging materials of the related art under a high-temperature and high-humidity environment for an extended period of time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polyolefin bonding adhesive film, comprising:
   a support base layer being a cast polypropylene film; and
   a bonding adhesive layer being formed on a side surface of the support base layer by co-extrusion;
   wherein the bonding adhesive layer is formed of a first polyolefin copolymer modified by maleic anhydride;
   wherein the first polyolefin copolymer is formed by copolymerization of propylene and 1-butene, a first graft ratio of the maleic anhydride grafted onto the first polyolefin copolymer is between 0.5% and 5%, and a first melt index of the first polyolefin copolymer is between 3 g/10 min and 5 g/10 min as measured according to ASTM D1238 at 190° C. and 2.16 kg;
   wherein, based on the total weight of the support base layer being 100 wt %, a material composition of the support base layer includes: 60 wt % to 80 wt % of a propylene block polymer, 15 wt % to 25 wt % of a vinyl elastomer, and 5 wt % to 15 wt % of a second polyolefin copolymer;
   wherein, in the support base layer, the propylene block polymer includes blocks consist of ethylene propylene elastic rubber, and a weight percentage of the ethylene propylene elastic rubber in the propylene block polymer ranges from 18% to 30%; wherein the vinyl elastomer is an ethylene-butylene elastomer, and a weight percentage of ethylene in the vinyl elastomer ranges from 30% to 60%;
   wherein the second polyolefin copolymer is modified by maleic anhydride, the second polyolefin copolymer is formed by copolymerization of propylene and 1-butene, a second graft ratio of the maleic anhydride grafted onto the second polyolefin copolymer is between 0.5% and 5%, and a second melt index of the second polyolefin copolymer is between 3 g/10 min and 5 g/10 min as measured according to ASTM D1238 at 190° C. and 2.16 kg; and
   wherein the support base layer further comprises 1.000 ppm to 4.000 ppm of a slip agent selected from silicon dioxide and talc.

2. The polyolefin bonding adhesive film according to claim 1, wherein, in the bonding adhesive layer, the first melt index of the first polyolefin copolymer is between 3 g/10 min and 4 g/10 min.

3. The polyolefin bonding adhesive film according to claim 1, further comprising: a heat sealing film layer being formed on another side surface of the support base layer by co-extrusion.

4. The polyolefin bonding adhesive film according to claim 3, wherein a material composition of the heat sealing film layer includes a propylene polymer, and the propylene polymer is at least one of a propylene copolymer (co-PP) and a propylene homopolymer (homo-PP).

5. The polyolefin bonding adhesive film according to claim 3, wherein a heat sealing strength of the heat sealing film layer of the polyolefin bonding adhesive film measured according to QB/T2358-1998 is not less than 80 N/15 mm.

6. The polyolefin bonding adhesive film according to claim 3, wherein a first thickness of the bonding adhesive layer is between 4 μm and 12 μm, a second thickness of the support base layer is between 15 μm and 35 μm, and a third thickness of the heat sealing film layer is between 4 μm and 12 μm.

7. The polyolefin bonding adhesive film according to claim 1, wherein the polyolefin bonding adhesive film is able to be bonded to a metal aluminum foil through the bonding adhesive layer, and a peeling strength between the polyolefin bonding adhesive film and the metal aluminum foil is not less than 10 N/15 mm.

8. The polyolefin bonding adhesive film according to claim 7, wherein an aluminum-plastic film is formed by the polyolefin bonding adhesive film bonded to the metal aluminum foil, and another peeling strength obtained by testing the aluminum-plastic film, after being placed in an electrolyte environment of 85° C. and soaked for 168 hours, is greater than 8.5 N/15 mm.

* * * * *